United States Patent
Maegawa

(10) Patent No.: US 6,835,078 B2
(45) Date of Patent: Dec. 28, 2004

(54) CABLE REEL

(75) Inventor: Akihito Maegawa, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 24 days.

(21) Appl. No.: 10/616,971

(22) Filed: Jul. 11, 2003

(65) Prior Publication Data

US 2004/0023536 A1 Feb. 5, 2004

(30) Foreign Application Priority Data

Jul. 31, 2002 (JP) .................................. 2002-223203

(51) Int. Cl.$^7$ ................................................ H01R 3/00
(52) U.S. Cl. ..................................................... 439/164
(58) Field of Search .................................. 439/164, 15

(56) References Cited

U.S. PATENT DOCUMENTS

| | | | | |
|---|---|---|---|---|
| 4,824,396 A | * | 4/1989 | Sasaki et al. | 439/164 |
| 5,655,920 A | * | 8/1997 | Bannai et al. | 439/164 |
| 5,683,259 A | * | 11/1997 | Sato | 439/164 |
| 5,700,153 A | * | 12/1997 | Kawamura et al. | 439/164 |
| 6,341,969 B1 | * | 1/2002 | Taniuchi et al. | 439/164 |
| 6,641,415 B2 | * | 11/2003 | Maegawa | 439/164 |

FOREIGN PATENT DOCUMENTS

| | | |
|---|---|---|
| JP | 6203940 | 7/1994 |
| JP | 7169544 | 7/1995 |

OTHER PUBLICATIONS

English Language Abstract of JP Appln. No. 6–203940.
English Language Abstract of JP Appln. 7–169544.

* cited by examiner

Primary Examiner—Tho D. Ta
(74) Attorney, Agent, or Firm—Greenblum & Bernstein, P.L.C.

(57) ABSTRACT

A cable reel is provided for more secure attachment of a flat cable within a cable holder installed in a rotatable housing on an automobile steering column. A rib member extending downward from the top wall of the rotatable housing presses against a flange portion and upper portion of the cable holder when the cable holder is installed within a space in the rotatable housing. This structure reinforces the end of the cable holder to prevent deformation that can damage the soldered joint that connects the flat cable conductors to the bus bar within the cable holder.

20 Claims, 5 Drawing Sheets

CABLE REEL

BACKGROUND OF THE INVENTION

1. Field of the Invention

The present invention relates to a cable reel for an automotive steering device.

2. Description of the Related Art

Cable reels may be provided for electrical connections between steering columns and rotatable steering wheels. For example, a conventional cable reel is shown in FIGS. 4 and 5.

As shown in FIG. 4, a cable reel provides a movable electrical connection between a fixed housing 1, which is fixedly attached to a steering column, and a rotatable housing 2, which is fixedly attached to a rotatable steering wheel. Spiral-wound flat cable 3 resides in a circular space formed between an outer wall 1c of fixed housing 1 and an inner wall 2c of rotatable housing 2.

The ends of flat cable 3 are attached to bus bars 5 and 8 which are located within respective cable holders 4 and 7. Lead wires 6 and 9 extend from respective bus bars 5 and 8 to external circuits. Cable holder 4, which is attached to one end of flat cable 3, resides within rotatable housing space 2a, and cable holder 7, which is attached to the other end of flat cable 3, resides within fixed housing space 1a.

As illustrated in FIG. 5, cable holder 4, which resides within rotatable housing 2, is an approximately L-shaped structure. Rib 2e, which is a plate-like member protruding from upper wall 2d of rotatable housing 2, presses inward on the external surface of cable holder end 4a from which flat cable 3 extends.

Because rotatable housing internal wall 2c is formed with a relatively small diameter in order to reduce the length of flat cable 3 to a minimum, rib 2e is only able to apply a limited amount of pressure as a result of its thin plate-like construction. When flat cable 3 unwinds from the rotation of rotatable housing 2, the bending of flat cable 3 in a direction opposite to the unwinding direction applies a load to the external side of cable holder end 4a. This load may cause rib 2e to bend or break, reducing the applied pressure below that required for flat cable 3 to be securely anchored within cable holder 4 in space 2a.

Moreover, once cable holder end 4a bends in an outward direction from the load applied by an unwinding flat cable 3, a load is also applied to soldered connection A between flat cable 3 and bus bar 5, increasing the possibility of damaging the soldered connection.

SUMMARY OF THE INVENTION

The present invention has been made in view of the above-described problems. Accordingly, it is an object of the present invention to provide structure for a cable reel that can increase the pressure through which the flat cable is held within the cable holder, and thus better protect the soldered connection between the flat cable and bus bar when the flat cable attempts to bend in a direction opposite to the unwinding direction.

According to one aspect of the present invention, there is provided a cable reel including a fixed housing, a rotatable housing rotatably connected to the fixed housing, and a flat cable positioned within a space defined between the fixed housing and the rotatable housing. The cable reel also includes a cable holder positioned on one end of the flat cable, the cable holder containing a joint portion connecting conductor wires of the flat cable and a bus bar. The cable holder includes an end portion from which the flat cable extends, and the end portion includes a flange portion. The rotatable housing includes a cable holder space configured to contain the cable holder, and a rib member extending from a wall of the rotatable housing adjacent to the cable holder space. The rib member is configured such that a first surface of the rib member contacts the end portion of the cable holder, and a second surface of the rib member, which is substantially perpendicular to the first surface, contacts the flange portion.

When the rotatable housing turns in the cable unwinding direction, the flat cable attempts to fold back in a direction opposite to the unwinding direction. External pressure is applied to the end of the cable holder from which the flat cable extends, and the flange portion presses against the edge of the rib member. Because of its plate-like shape, the rib member tends to bend easily when a load is applied against its planar surface. However, the rib member is able to provide a high degree of rigidity due to a load being applied by the flange portion of the cable holder to the edge of the rib member in a direction substantially perpendicular to the rib member's planar surface. The rib member is thus reinforced by the protruding flange portion contacting the edge of the rib member when the flat cable unwinds. This structure increases the grip of the case holder on the flat cable while preventing damage to the rib member. The cable holder structure is more resistant to bending, making it difficult for loads from the flat cable to reach the soldered joint that connects the flat cable to the bus bar. This reduces the chances of damaging the joint, and thereby increases the reliability of the electrical connection.

According to a further aspect of the present invention, the cable reel includes a guide flap extending from the end portion of the cable holder from which the flat cable extends. The guide flap may extend along a surface of the flat cable, including an inner surface. The guide flap may be bonded to a surface of the flat cable, including an inner surface. The guide flap may rigid, and inhibits bending of a portion of the flat cable adjacent to the cable holder.

The installation of a rigid or flexible guide flap, which extends from the end of the cable holder along the outer or inner surface of the flat cable, prevents the flat cable from folding back in a direction opposite to the cable unwinding direction. The guide flap may be made from a flexible or rigid synthetic resin, and the guide flap may be bonded to the flat cable.

According to a further aspect of the present invention, the fixed housing and the rotatable housing are substantially cylindrical, and the flat cable is wound in a predetermined direction within the space defined between the fixed housing and the rotatable housing.

According to a further aspect of the present invention, the first surface and the second surface of the rib member inhibit bending of the end portion of the cable holder in order to prevent damage to the joint portion and to maintain one end of the flat cable in the cable holder.

According to another aspect of the present invention, there is provided a cable reel in which a flat cable is positioned between a rotatable housing and a fixed housing. The cable reel includes a cable holder containing a joint portion connecting conductor wires of the flat cable and a bus bar, the cable holder including an end portion from which the flat cable extends. The cable reel also includes a cable holder mounting position on the rotatable housing and a rib member positioned on the rotatable housing adjacent to the cable holder mounting position. The rib member engages first and second substantially perpendicular surfaces of the end portion of the cable holder.

According to a further aspect of the present invention, the rib member includes first and second substantially perpendicular surfaces for respectively engaging the first and second substantially perpendicular surfaces of the end portion of the cable holder. The rib member inhibits bending of the end portion of the cable holder in order to prevent damage to the joint portion and to maintain one end of the flat cable in the cable holder.

According to a further aspect of the present invention, the cable reel includes a guide flap extending from the end portion of the cable holder from which the flat cable extends. The guide flap may extend along a surface of the flat cable, including an inner surface. The guide flap may be bonded to a surface of the flat cable, including an inner surface. The guide flap may rigid, and inhibits bending of a portion of the flat cable adjacent to the cable holder.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which.

DETAILED DESCRIPTION OF THE PREFERRED EMBODIMENTS

The particulars shown herein are by way of example and for purposes of illustrative discussion of the embodiment of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 4:
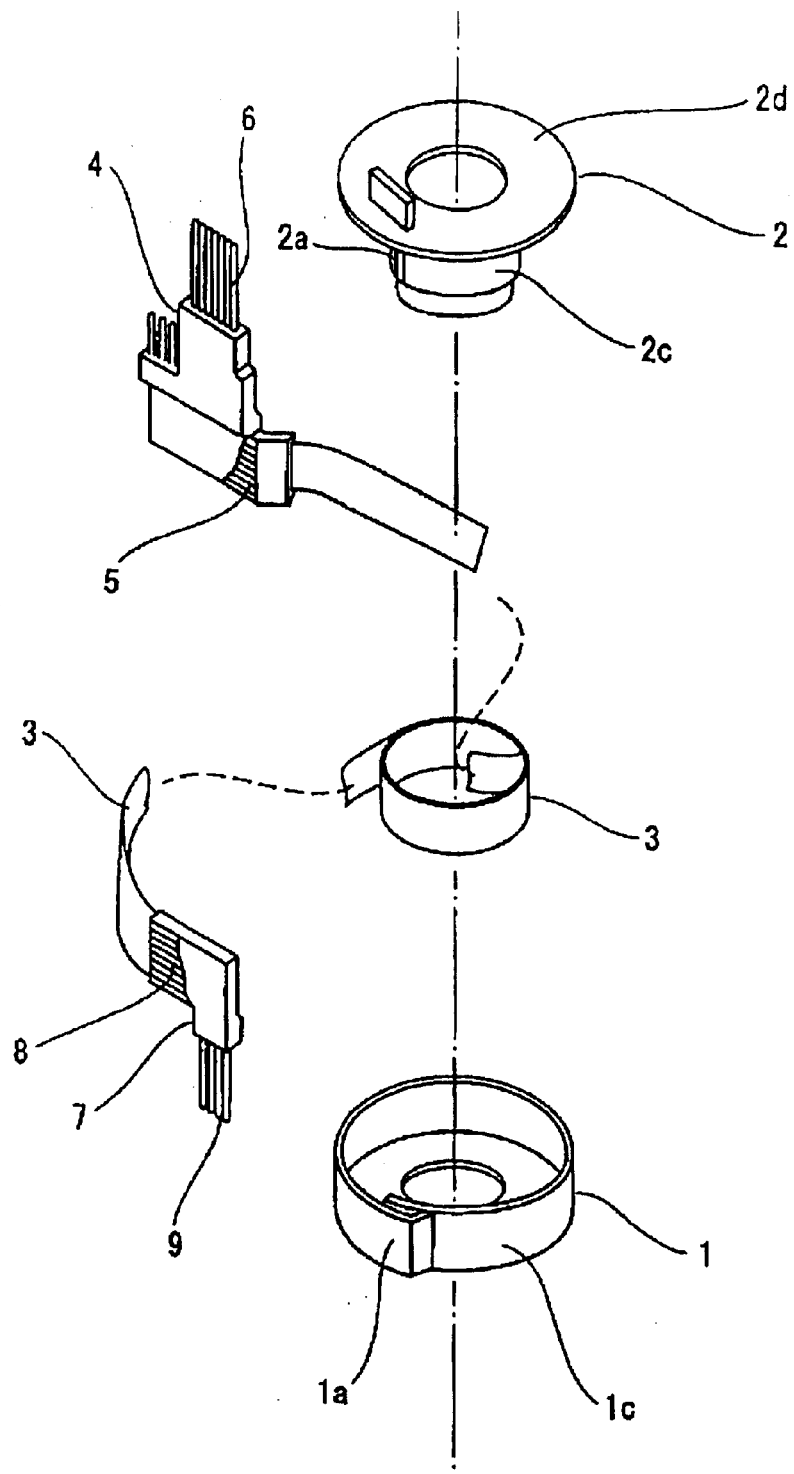
FIG. 4 is an exploded perspective view of a conventional cable reel assembly.
Figure 5:
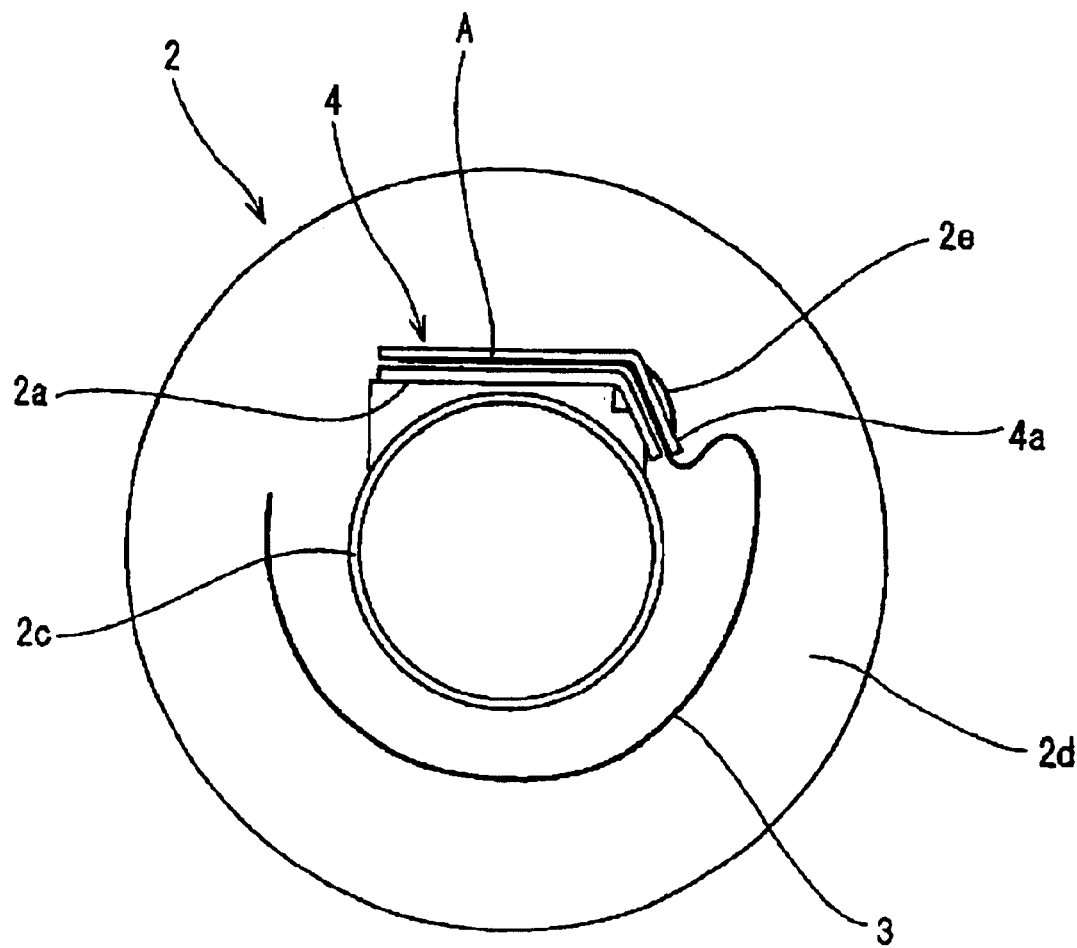
FIG. 5 is a view of a conventional rotatable housing with a conventional cable holder installed.

The following will describe an embodiment of the invention with reference to the drawings. Because the cable-gripping structure of the cable holder, as embodied by the invention, can be used in a cable reel housing similar to that shown FIG. 4, a description of the general structure of the cable reel housing will be omitted.

Figure 1:
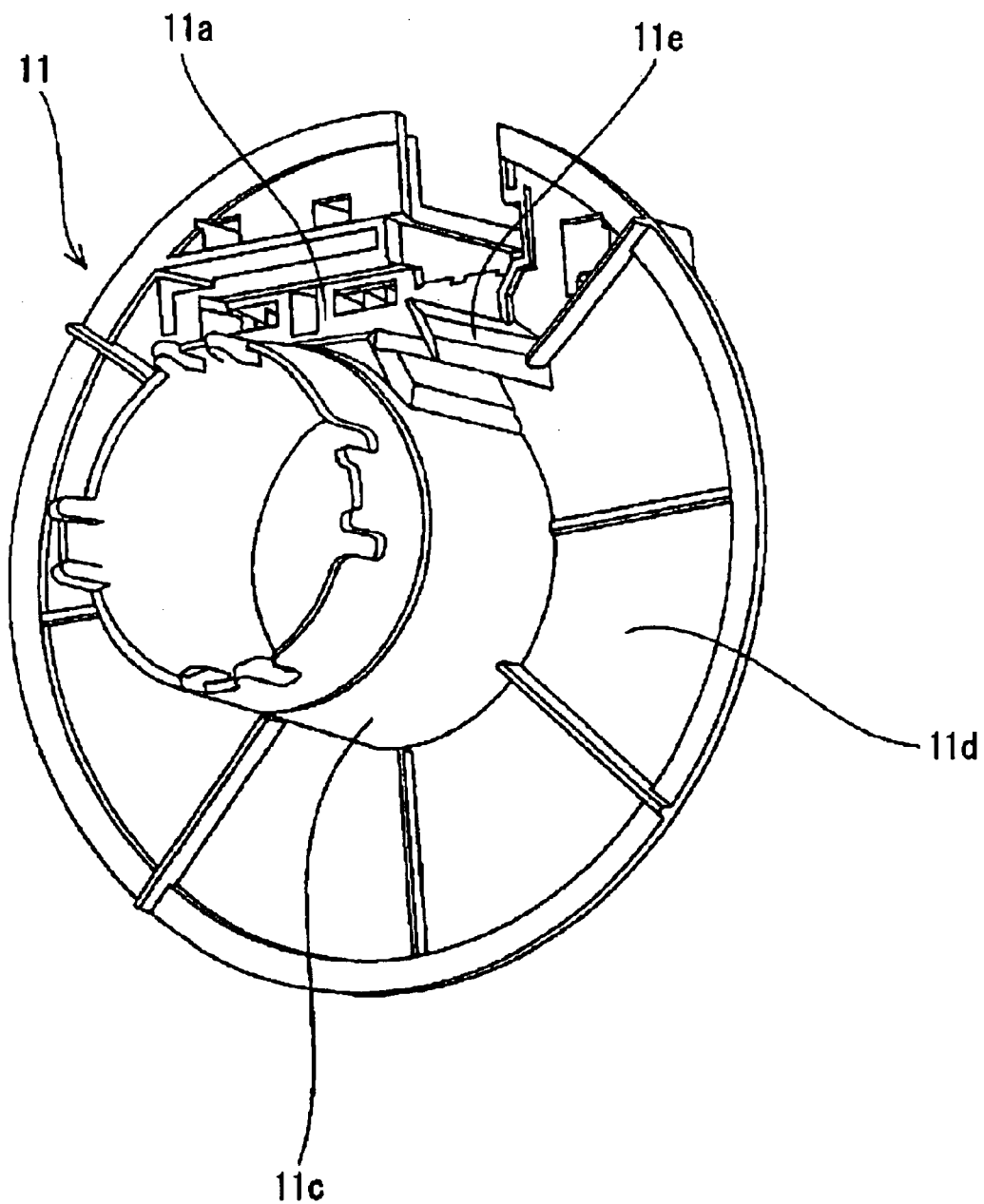
FIG. 1 is a perspective view of the rotatable housing, before installation of the cable holder, of an embodiment of the invention.

FIG. 1 illustrates rotatable housing 11 having a top wall 11d which may be disc-shaped. A cylindrical structure, in the form of an inner cylinder wall 11c, protrudes downward from the center of top wall 11d. Space 11a is configured to accommodate a cable holder 12 installed therein, and is provided at a predetermined location on top wall 11d. A rib member 11e protrudes from top wall 11d adjacent to space 11a. Rib member 11e may have any suitable configuration, such as that of a plate element.

Figure 2:
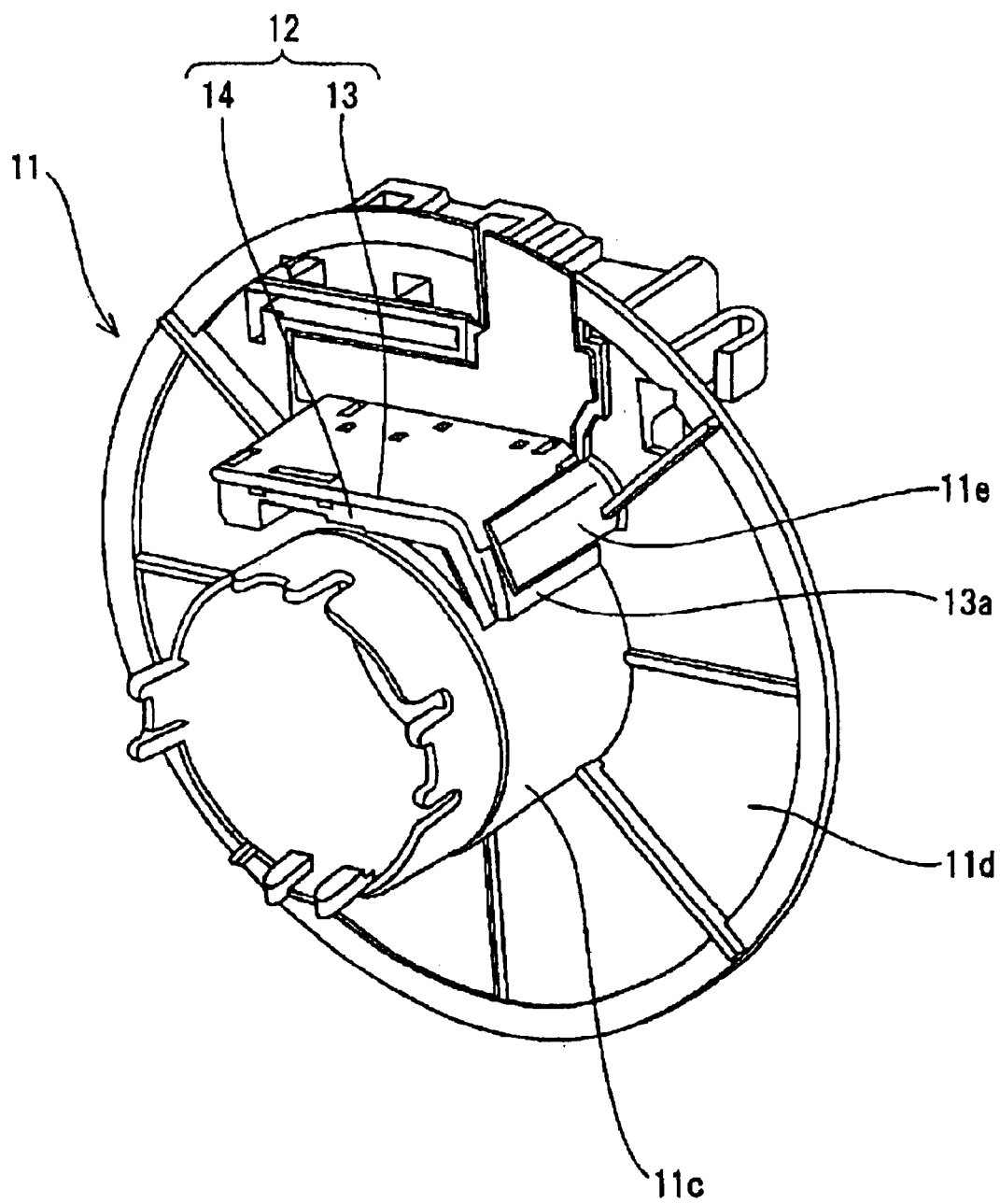
FIG. 2 is a perspective view of the rotatable housing of FIG. 1 after installation of the cable holder.
Figure 3:
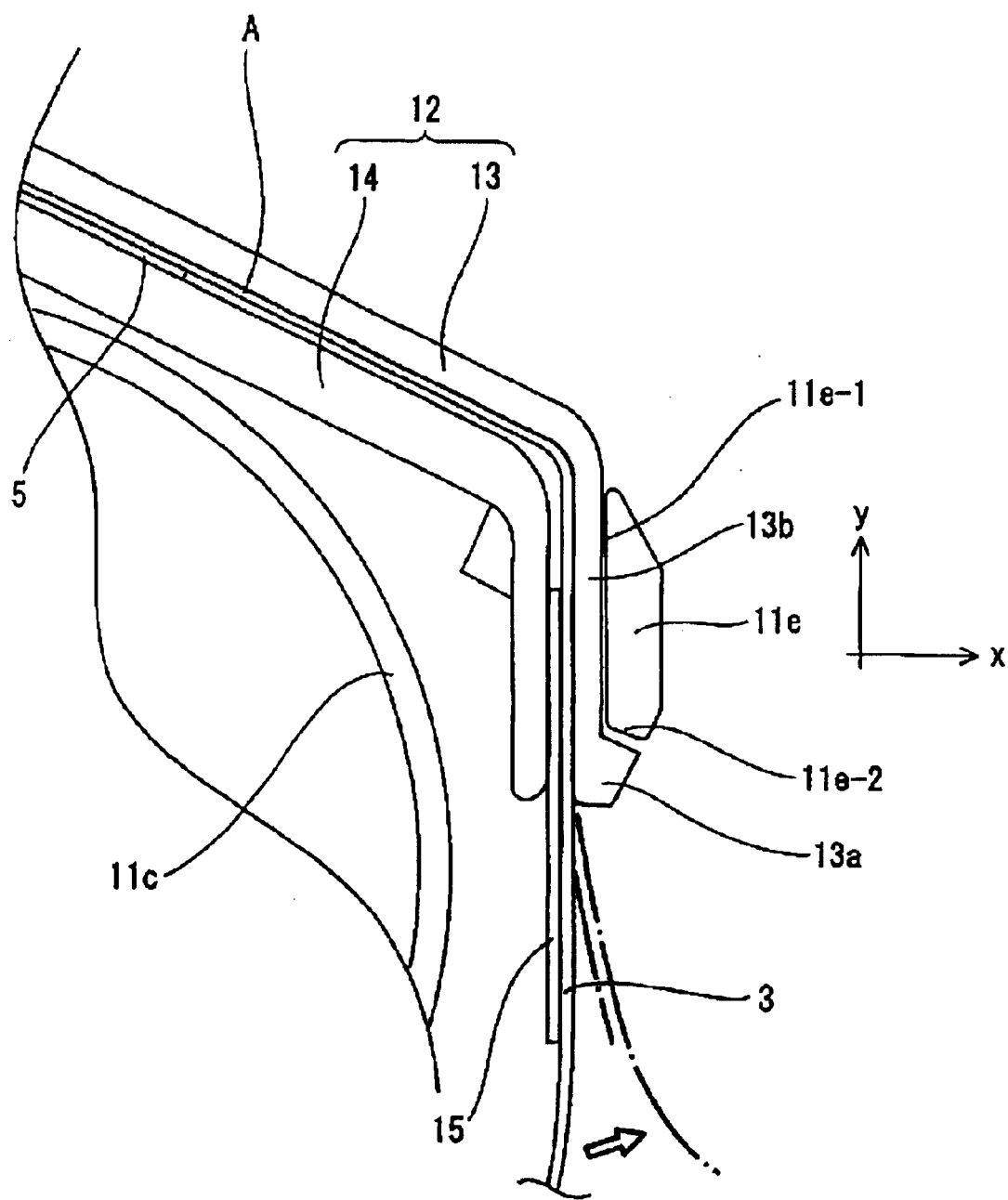
FIG. 3 is an enlarged partial view of portions of the rotatable housing and cable holder of FIG. 2.

A cable holder 12 may have any suitable configuration, such as that of an approximately L-shaped element. Cable holder 12 includes a top plate 13 sandwiched to base plate 14. As shown in FIGS. 2 and 3, cable holder 12 is installed within a space 11a of rotatable housing 11, and provides an anchoring structure for one end of a flat cable 3 which is inserted between the plates 13 and 14. One end of a guide flap 15, which prevents flat cable 3 from folding back in a direction opposite to the unwinding direction, and a bus bar 5 are sandwiched between top plate 13 and base plate 14. The end of flat cable 3 is connected to bus bar 5 in any suitable manner, such as by a soldered joint A. A flange portion 13a extends from the externally facing surface of top plate 13 at the end of cable holder 12 from which flat cable 3 extends. Moreover, guide flap 15, which may be made of any suitable material, such as flexible or stiff synthetic resin, may be bonded to the inner surface of flat cable 3 to prevent flat cable 3 from folding back in a direction opposite to the unwinding direction. Alternatively, guide flap 15 may be located on the external surface of flat cable 3, or on both the internal and external surfaces of flat cable 3, and either bonded or not bonded thereto. For reasons of clarity, flat cable 3 and guide flap 15 have been omitted from FIG. 2.

With cable holder 12 inserted and secured within space 11a in rotatable housing 11, surface 11e-1 of rib member 11e is in contact with the external surface of end portion 13b of cable holder top plate 13, and flange portion 13a, which protrudes outward from the end of cable holder top plate 13, is in contact with edge portion 11e-2 of rib member 11e.

When rotatable housing 11 turns in a direction that unwinds flat cable 3, guide flap 15 prevents flat cable 3 from folding back in a direction opposite to the unwinding direction. When flat cable 3 attempts to fold back against the pressure of guide flap 15 in the direction shown by the outlined arrow in FIG. 3, flange portion 13a presses against edge portion 11e-2 of rib member 11e in the Y-direction. The end portion 13b of cable holder top plate 13 opposed to surface 11e-1 is prevented from deforming in the X-direction due to the rigidity of rib member 11e.

Because the secure cable gripping structure of the present invention prevents the deformation of end portion 13b of top plate 13, the end portion 13b presses against surface 11e-1 of rib member 11e without bending in the X-direction. The strength of the cable holding structure is increased as a result of edge portion 11e-2 preventing flange portion 13a from bending when flat cable 3 unwinds, and thus cable holder 12 maintains a secure grip on flat cable 3.

Moreover, since the structure makes it difficult for cable holder 12 to bend, the load on soldered joint A which connects flat cable 3 to bus bar 5, is reduced. This reduces the likelihood of damaging the joint and provides for a more reliable electrical connection. Also, the rigid guide flap 15 positioned along the undersurface of flat cable 3 prevents flat cable 3 from folding back in a direction opposite to the cable unwinding direction. Guide flap 15 may also be disposed on the upper surface of flat cable 3.

The invention has the desirable effect of preventing the cable holder from bending when the flat cable applies pressure to the cable holder as a result of the rotatable housing turning in a direction that unwinds the flat cable. Bending is prevented by the rigid edge portion of the rib member contacting the outwardly protruding edge portion of the cable holder. The cable holder thus maintains a more secure grip on the flat cable while also reducing the possibility of damaging the rib member. Moreover, as the tendency of the cable holder to bend is all but eliminated, a load placed on the flat cable is not easily transferred to the soldered joint of the bus bar, thus reducing the likelihood of damaging the soldered joint and improving the reliability of the electrical connection therein.

Furthermore, the installation of a rigid guide flap, located along the outer or inner surface of the flat cable at the point where the cable extends from the end of the cable holder, prevents the flat cable from folding back in a direction opposite to the cable unwinding direction.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Patent Application No. 2002-223203 filed on Jul. 31, 2002, which is herein expressly incorporated by reference in its entirety.

What is claimed:

1. A cable reel comprising:
   a fixed housing;
   a rotatable housing rotatably connected to said fixed housing;
   a flat cable positioned within a space defined between said fixed housing and said rotatable housing; and
   a cable holder positioned on one end of said flat cable, said cable holder containing a joint portion connecting conductor wires of said flat cable and a bus bar, said cable holder including an end portion from which said flat cable extends, said end portion including a flange portion;
   said rotatable housing comprising:
      a cable holder space configured to contain said cable holder; and
      a rib member extending from a wall of said rotatable housing adjacent to said cable holder space, said rib member configured such that a first surface of said rib member contacts the end portion of said cable holder, and a second surface of said rib member, which is substantially perpendicular to said first surface, contacts the flange portion.

2. The cable reel according to claim 1, wherein said fixed housing and said rotatable housing are substantially cylindrical, and said flat cable is wound in a predetermined direction within said space defined between said fixed housing and said rotatable housing.

3. The cable reel according to claim 1, wherein said first surface and said second surface of said rib member inhibit bending of the end portion of said cable holder in order to prevent damage to the joint portion and to maintain one end of said flat cable in said cable holder.

4. The cable reel according to claim 1, further comprising a guide flap extending from the end portion of said cable holder from which said flat cable extends.

5. The cable reel according to claim 4, wherein said guide flap is rigid.

6. The cable reel according to claim 4, wherein said guide flap inhibits bending of a portion of said flat cable adjacent to said cable holder.

7. The cable reel according to claim 4, wherein said guide flap extends along a surface of said flat cable.

8. The cable reel according to claim 7, wherein the surface of said flat cable is an inner surface.

9. The cable reel according to claim 4, wherein said guide flap is bonded to a surface of said flat cable.

10. The cable reel according to claim 9, wherein the surface of said flat cable is an inner surface.

11. A cable reel in which a flat cable is positioned between a rotatable housing and a fixed housing, said cable reel comprising:
   a cable holder containing a joint portion connecting conductor wires of the flat cable and a bus bar, said cable holder including an end portion from which the flat cable extends;
   a cable holder mounting position on the rotatable housing; and
   a rib member positioned on the rotatable housing adjacent to the cable holder mounting position, wherein said rib member engages first and second substantially perpendicular surfaces of the end portion of said cable holder.

12. The cable reel according to claim 11, wherein said rib member inhibits bending of the end portion of said cable holder in order to prevent damage to said joint portion and to maintain one end of the flat cable in said cable holder.

13. The cable reel according to claim 11, wherein said rib member includes first and second substantially perpendicular surfaces for respectively engaging the first and second substantially perpendicular surfaces of the end portion of said cable holder.

14. The cable reel according to claim 13, wherein said rib member inhibits bending of the end portion of said cable holder in order to prevent damage to said joint portion and to maintain one end of the flat cable in said cable holder.

15. The cable reel according to claim 11, further comprising a guide flap extending from the end portion of said cable holder from which the flat cable extends.

16. The cable reel according to claim 15, wherein said guide flap is bonded to a surface of the flat cable.

17. The cable reel according to claim 15, wherein said guide flap is rigid.

18. The cable reel according to claim 15, wherein said guide flap inhibits bending of a portion of the flat cable adjacent to said cable holder.

19. The cable reel according to claim 15, wherein said guide flap extends along a surface of the flat cable.

20. The cable reel according to claim 19, wherein the surface of the flat cable is an inner surface.

* * * * *